United States Patent [19]

Pedain et al.

[11] 3,867,350

[45] Feb. 18, 1975

[54] POLYURETHANE UREA ELASTOMERS BASED ON POLYCARBONATE MACRODIOLS

[75] Inventors: Josef Pedain; Klaus Noll, both of Cologne; Klaus Konig, Leverkusen; Wilhelm Thoma, Bergisch-Neukirchen, all of Germany

[73] Assignee: Bayer Aktiengesellschaft, Leverkusen, Germany

[22] Filed: Apr. 20, 1973

[21] Appl. No.: 353,036

[30] Foreign Application Priority Data
May 4, 1972  Germany.............................. 2221751

[52] U.S. Cl. ...... 260/77.5 AM, 8/115.6, 260/77.5 D
[51] Int. Cl............................................. C08g 22/10
[58] Field of Search ............. 260/75 NK, 77.5 AM, 260/77.5 AN, 77.5 D, 75 NH

[56] References Cited
UNITED STATES PATENTS

| | | |
|---|---|---|
| 3,359,242 | 12/1967 | Seeliger et al. ................ 260/77.5 D |
| 3,450,793 | 6/1969 | Schnell et al. ................. 260/77.5 D |
| 3,541,183 | 11/1970 | Kallert et al. .................. 260/77.5 D |
| 3,639,354 | 1/1972 | Mueller et al. ................. 260/77.5 D |
| 3,640,967 | 2/1972 | Koenig et al. ................ 260/77.5 AN |
| 3,658,746 | 4/1972 | Rosendahl et al. .......... 260/77.5 AM |
| 3,708,453 | 1/1973 | Thoma et al. ................. 260/77.5 SP |
| 3,711,443 | 1/1973 | Thoma et al. ................. 260/77.5 SP |
| 3,758,443 | 9/1973 | Koenig et al. .............. 260/77.5 AM |
| 3,770,681 | 11/1973 | Witt et al. ...................... 260/77.5 D |

*Primary Examiner*—H. S. Cockeram
*Attorney, Agent, or Firm*—Gene Harsh

[57] ABSTRACT

Polyurethane urea elastomers with novel dissolution behavior and which are synthesized from polycarbonate macrodiols, diisocyantes and diamines and which can be prepared and dissolved in aqueous solvents.

These elastomers have the advantage of being less of a physiological hazard, more resistant to common solvents and require less emulsifiers and dispersion aid.

2 Claims, No Drawings

POLYURETHANE UREA ELASTOMERS BASED ON POLYCARBONATE MACRODIOLS

This invention relates to polyurethane urea elastomers with novel dissolution behavior which are synthesized from polycarbonate macrodiols, diisocyanates and diamines and which can be prepared and dissolved in aqueous solvents. The invention also relates to the use of these elastomers for the production of coatings, coverings, films and lacquers.

The problem which the invention seeks to solve is imposed by the necessity to keep air and water free from pollution. An object of the invention is to provide elastomers with valuable properties for coatings, coverings, films and lacquers which, during processing, do not give off any physiologically harmful, environment-polluting solvents. Another object of the invention is further to improve the high commercial standing of polyurethane and polyurea elastomers in the aforementioned fields.

Solutions of polyurethane and polyurea elastomers are already being extensively used for coatings. Although the products do not always have to be subsequently subjected to a crosslinking reaction, they generally show favorable resistance to chemicals and reagents of the kind usually met in daily life. However, it follows from this that, in general, polymers such as these cannot be processed in such solvents. It is necessary to use relatively expensive solvents with high boiling points and high dissolving power such for example, as dimethyl formamide, dimethyl acetamide and N-methyl pyrrolidone. The proper use of these solvents necessitates elaborate recovery or burning installations for the solvents. Processing regulations have to be strictly observed because some of the high boiling organic solvents referred to above are also physiologically harmful.

Polyurea elastomers synthesized from cycloaliphatic isocyanates are exceptions in the above. They have the advantage of greater light stability and can also be dissolved in "soft solvents," for example, in mixtures of aromatic solvents and alcohols (for example toluene/isopropanol).

Unfortunately, the known products of this kind do not satisfy modern requirements. Some textile coatings prepared from these elastomers show only moderate resistance to trichlorethylene and perchlorethylene, which means that they can only be dry cleaned to a limited extent, thereby restricting their use. The processing of solutions containing aromatic hydrocarbons calls for special safety precautions on account of the unfavorable properties of these substances, for example their high inflammability and, in some cases, their toxicity.

The prior art also includes polyurethane dispersions in water which undoubtedly present no health hazards in processing. However, a serious disadvantage of these systems is that they require a high content of emulsifiers or dispersion aids, which results in inadequate stability of the coatings and films to moisture, and, above all, to the effects of weather. In the case of ionic dispersions, the high sensitivity of the products to electrolytes occasionally results in premature precipitation, a highly undesirable phenomenon.

Polyurethanes based on polyethylene oxide glycols which are dissolved in water are described in U.S. Pat. No. 3,189,578. Even after they have been applied to substrates and dried, these resins are still soluble in water. Accordingly, they are not suitable for coatings which are exposed to hydrolytic influences.

The present invention substantially reduces or obviates the disadvantages referred to above and eliminates undesirable properties of the products prepared according to the prior art.

The invention relates to polyurethane urea elastomers corresponding to the formula

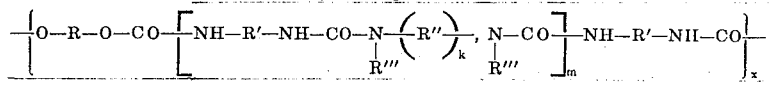

in which
R represents the group

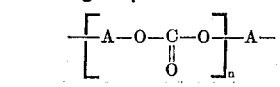

where 40 to 100 percent by weight, preferably 60 to 100 percent by weight, of A represents $-(CH_2-CH_2-O)_p\, CH_2-CH_2-$ while 0 to 60 percent by weight, preferably 0 to 40 percent by weight, of A represents $-(CH_2)_q-$
and in which
$p = 2 - 7$;
$q = 6$ or $7$ and
$n = 2 - 40$,
R' represents a divalent $C_6-C_{14}$ aromatic, $C_4-C_{18}$ aliphatic or $C_5-C_{20}$ cycloaliphatic radical,
R'' represents a divalent $C_6-C_{14}$ aromatic, $C_4-C_{18}$ aliphatic or $C_5-C_{20}$ cycloaliphatic radical, which may contain nitrogen as heteroatom,
or a

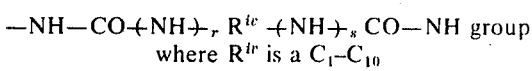

where $R^{iv}$ is a $C_1-C_{10}$ aliphatic or $C_5-C_{20}$ cycloaliphatic radical,
$r = 0$ or $1$;
$s = 0$ or $1$,
R''', represents H or a $C_1-C_6$ aliphatic radical, and
$k = 0$ or $1$;
$m = 0-4$;
$x = 5-200$;
at least 20 mol percent, preferably at least 40 mol percent, of R' and/or R'' being cycloaliphatic radicals.

The invention also relates to a process for the production of polyurethane urea elastomers from prepolymers with terminal NCO groups based on dihydroxy polycarbonates, which may in addition contain monomeric diisocyanates and chain extenders containing amino groups, in which dihydroxy polycarbontes of molecular weight 500 to 6,000, prepared from a diol mixture of 40 to 100 percent by weight, preferably 60 to 100 percent by weight, of polyethylene glycols and of 0 to 60 percent by weight, preferably 0 to 40 percent by weight, of 1,6-hexane diol and/or 1,7-heptane diol and carbonic acid derivatives, are reacted with diisocyanates to form a prepolymer preferably with an NCO content of from 1.0 to 10.0 percent by weight, and the prepolymer thus obtained, which may be dissolved in an inert organic solvent or suspended in water, is reacted with diamines, hydrazines, dihydrazides or semicarbazides, preferably dissolved in alcohol (which may be aqueous), with a molar ratio of active H : NCO of from 0.8 : 1 to 1 : 1, accompanied by chain extension, at least 20 mol percent and preferably at least 40 mol percent of the diisocyanate and/or of the chain extender being cycloaliphatic in nature.

The invention also relates to the use of the products according to the invention for the production of textile coatings, films, sheeting and lacquers.

More particularly, the invention provides polyurea elastomers which can be used and dissolved in solvent mixtures which, in addition to water, only contain components of the kind which have an MAK-value of 900 mg/m$^3$ and above, according to the "Richlinien fur chemische Laboratorien" der Berufsgenossenschaft der Chemischen Industrie, 1969. The MAK-value is the concentration of a gas or vapor which can be expected daily over a working day of about 8 hours and which, even with repeated ingestion, does not cause any damage to health.

The main advantage of the invention over the prior art is obviously embodied in the surprising novel solution properties of the polyurethane urea elastomers according to the invention. Although the coatings, coverings, films and lacquers prepared from them are uncrosslinked and still thermoplastic after application and drying so that they can also be formed and embossed while still hot, they do nevertheless show unexpectedly high resistance to attacking solvents such as toluene or perchlorethylene, which is of considerable advantage so far as dry cleaning is concerned. On the other hand, they also show remarkably high resistance to hydrolytic influences. The products are insoluble both in pure water and in pure alcohol.

Contact with tap water at 70°C over a period of several weeks produces hardly any change in their properties.

The products are understandably less resistant to mixtures of water and alcohols. If resistance to these mixtures is also required, the polyurethane ureas according to the invention can be crosslinked surprisingly easily and under mild conditions, by the addition of formaldehyde or formaldehyde derivatives such as, for example, formaldehyde-melamine resins or by the addition of polyols whose OH-groups have been closed with methoxy methyl isocyanate (cf., for example German Offenlegungsschrift No. 1,644,815). Cross-linking makes the products according to the invention resistant to water/alcohol mixtures and also to other solvents such as dimethyl formamide.

The mechanical properties of the coatings, coverings, films and lacquers produced with the polyurethane urea elastomers according to the invention are also surprisingly good. Whereas polyethers incorporated into polyurethanes are known to lead to soft coatings which often have a tacky feel and limited strength, coatings prepared with the polyurethane urea elastomers according to the invention, although containing ether groups, have a dry feel and high strength and can be made soft or hard as required.

The polycarbonate macrodiols used in accordance with the invention are predominantly difunctional, i.e., they contain two hydroxyl groups in the molecule, and preferably have a molecular weight of from 500 to 6,000, more preferably from 600 to 3,000.

It is preferred in order to obtain good flexibility properties that they be prepared from polyether glycols. Suitable polyether glycols include triethylene glycol, tetraethylene glycol, penta-, hexa-, hepta- and octa-ethylene glycol, and also mixtures of these glycols. In addition, however, 1,6-hexane diol and 1,6-heptane diol can also be used for preparation in quantities of up to 60 percent by weight, but preferably in quantities of less than 40 percent by weight, based on diols. Preferred diol components for preparation of the polycarbonate macrodiols include tri-, tetra-, octa-ethylene glycols and 1,6-hexane diol.

The polycarbonates are synthesized by methods known per se. The glycols are condensed either with diaryl carbonates, for example with diphenyl carbonate, in which case phenol is eliminated, or with phosgene in which case hydrochloric acid is eliminated, (cf., for example, German Offenlegungsschrift No. 1,915,908). The preparation of a representative macrodiol polycarbonate is described in the following.

4,365 parts of tetraethylene glycol (22.5 mols) are mixed with 4,280 parts (20 mols) of dihpenyl carbonate; the resulting mixture is fused and gradually heated over a period of 10 hours at 15 Torr from 150° to 200°C, 3,700 parts of phenol being distilled off. Thereafter the mixture is stirred for 1 hour at 200°C/1 Torr, another 50 parts of phenol distilling off. A viscous oil is obtained which crystallizes after a few days. Softening point approximately 50°C; OH— number 57.2; aromatic content:

1. free phenol: 0.03 percent
2. phenyl carbonate terminal groups: 0.01 percent
3. phenol ether groups: 0.01 percent The polyurea elastomers according to the invention can be prepared with the low molecular weight diiscoyanates known per se in polyurethane chemistry, such as for example 4,4'-diisocyanato diphenyl methane, 2,4- and 2,6-toluene diisocyanate and 1,5-naphthalene diisocyanate. It is preferred to use diisocyanate with aliphatic NCO groups such as, for example, 1,4-xylylene diisocyanate, 1,3-xylylene diisocyanate, 4,4'-dicyclohexyl methane diisocyanate, 2,2,4-trimethyl hexane-1,6-diisocyanate, cyclohexane-1,4- and 1,3-diisocyanate, 3,3'-dimethyl-4,4'-diisocyanato dicyclohexyl methane and lysine-$C_1$-$C_6$-alkyl ester diisocyanates.

Of the aliphatic isocyanates, 1,6-diisocyanato hexane and 1-isocyanato-3-isocyanato-methyl-3,5,5-trimethyl cyclohexane are particularly preferred.

A prepolymer is initially formed in known manner from the polycarbonate macrodiols and the diisocyanates. The reaction is generally carried out at temperatures of from 50° to 150°C, preferably in the melt or in an inert organic anhydrous solvent, for example in a ketone such as acetone. NCO-prepolymer formation is generally carried out with an OH:NCO reaction ratio of from 1 : 1.5 to 1 : 5, preferably from 1 : 1.5 to 1 : 3.5, the ratio being governed both by the molecular weight of the polycarbonate macrodiol and by the required properties of the end products. (With molar ratios of OH to NCO of less than 1 : 2, the reacted mixture still contains free monomeric diisocyanate. The expression "prepolymer" is also intended to cover mixtures of this kind in the following). In general, the ratio should be such that the solvent-free prepolymer has an NCO content of from 1.0 to 10.0 percent by weight of NCO.

The prepolymer containing NCO groups is further reacted to form the polyurethane urea elastomer according to the invention. The reaction with the diamine, hydrazine or dihydrazide is generally carried out with cooling at temperatures of from −20° to +40°C, preferably at temperatures of from 0° to 30°C. Since at this temperature the prepolymers are liquids of extremely high viscosity which are extremely difficult to stir, it is preferred to prepare initially a suspension of the prepolymer in water at 0° to 20°C. The reagent (diamine, hydrazine or dihydrazide) is then added in alcoholic solution. The solutions generally have a solids content of from 10 to 60 percent and water : alcohol ratios of 2 : 1 to 1 : 2. If it is not desired to prepare a solution, but to isolate the solvent-free polyurethane urea instead, a higher water content will be selected, for example a water to alcohol ratio 3 : 1. Although a solution is initially formed, it clouds or gels on standing. The polyurethane urea is obtained in the form of a moist powder or granulate which can be dried.

This procedure cannot be applied where a solvent has been used in the preparation of the prepolymer. Nor is it of any advantage where an aromatic diisocyanate or a macrodiol polycarbonate of high triethylene glycol, 1,6-hexane diol or 1,7-heptane diol content has been used in the preparation of the prepolymer. In this case, the chain extender-diamine, hydrazine, or dihydrazide is dissolved in a mixture of water and alcohol and the resulting solution added to the prepolymer dissolved in an inert solvent. Preferred solvents are esters and ketones. The ratio of the water : alcohol mixture (ratio 1 : 2 to 2 : 1), to this solvent is about 1 : 4 to 4 : 1.

In both procedures, it is of course also possible to adopt the reverse procedure, i.e., to add the solution or suspension of the prepolymer to the solution of the diamine, hydrazine or dihydrazide. In either case, the chain-extending reaction itself takes place in homogeneous phase because genuine solutions are formed when the prepolymer and the dissolved chain extender are mixed.

In order to avoid possible side reactions an excess of basic groups should be avoided as far as possible during the reaction. The diamines, hydrazines or bishydrazides are reacted with the NCO-prepolymers, preferably in a ratio of 0.8 : 1 to 1 : 1. Small quantities of monoamine can be used in the usual way for chain termination in the polyaddition reaction.

The aliphatic diamines used as chain extenders can contain primary or secondary amino groups. Examples of diamines such as these include piperazine, hexamethylene diamine, ethylene diamine, 1,2-propylene diamine, N-methyl-bis-(3-aminopropyl)-amine, 1,4-(or 1,3-) diamino cyclohexane, 1-amino-3-aminomethyl-3,5,5-trimethyl cyclohexane, bis(4-amino cyclohexyl)-methane.

Preferred diamines are those which contain cyclohexane rings. Hydrazine and N,N'-dimethyl hydrazine also represent suitable chain extenders, as do bishydrazides such as βsemi-carbazido propionic acid hydrazide, 3-semi-carbazido-propyl-carbazinic esters, adipic acid dihydrazide and glutaric acid dihydrazide. Semi-carbazido-3-semi-carbazido methyl-3,5,5-trimethyl cyclohexane is preferably used.

A mixture of hydrazine hydrate and a diamine containing at least one cyclohexane ring represents a particularly preferred chain extender.

In order to obtain products with the required hydrolytic and mechanical properties and behavior with respect to solvents sought by the invention, the diisocyanates used for prepolymer formation and/or the chain extenders should contain at least 20 mol percent, preferably more than 40 mol percent, of cycloaliphatic compounds.

In addition to water, solvent mixtures suitable for the polyurethane ureas contain alcohols, esters and ketones, for example methanol, ethanol, propanols and butanols, ethylacetate, butylacetate, methylacetate, isopropylacetate, acetone, methylethyl ketone and methyl isobutyl ketone. Ethanol, isopropanol, ethylacetate and acetone are preferably used.

A high-boiling solvent such as, dimethyl formamide, which generally has to be added to polyurethane solutions in order to obtain satisfactory film formation during processing, is unnecessary because the water present in the solution has the same property. Accordingly, toxicologically unacceptable solvents, such as for example dimethyl formamide or aromatic hydrocarbons, can be avoided throughout the entire process for the production and processing of the products according to the invention.

The polyurethane ureas according to the invention can be used for the production of films, coatings, coverings and lacquers. Although they can be used in the form of powders, for example by the melt-calendering process, they are generally used in the form of solutions which contain the usual additives such as stabilizers, antiagers, UV-absorbers, hydrolysis inhibitors, pigments, dyes and fillers and which are applied for example by casting, knife-coating, spread-coating, brush-coating and spray-coating. For the production of coatings, they are applied to substrates such as leather, artificial leather, plastics, woven and knitted fabrics, while for the production of lacquers and coverings they are applied, or bonded in film-form, to wood, glass and metal. They can also be applied to intermediate substrates, for example release paper, in which case processing is carried out by the reversal process.

The invention is illustrated by the following Examples. Unless otherwise stated, percentages relate to percent by weight.

EXAMPLE 1

A. 1 mol of a polycarbonate macrodiol from tetraethylene glycol with an average molecular weight of 1,778 is heated for about 5 hours to 90° – 100°C with 2 mols of 1-isocyanato-3-isocyanatomethyl-3,5,5-trimethyl cyclohexane. An NCO prepolymer with an NCO-group content of 3.3 percent which is still liquid, even at room temperature, is obtained. B. 2,186 parts of water are added at 0° to 5°C, to 1,000 parts of the prepolymer obtained as in (A) and the mixture stirred to form an emulsion. The emulsion is stable and can be stored for several days at 0° and 10°C without undergoing any change in its NCO-content. To prepare the polyurethane urea elastomer, 93 parts of 4,4'-diamino-3,3'-dimethyl-di-cyclohexyl methane are dissolved in 2,186 parts of ethanol and the resulting solution allowed to flow slowly into the emulsion of the prepolymer. A clear 20 percent solution is formed during the actual addition of the amine solution, reaching its final viscosity of 800 CP after about 1 hour.

To prepare a textile coating, a pigment dye is added to the solution and the resulting product applied on a pair of rolls to a release paper. After brief drying at 100°C, a second layer is applied onto which a roughened textile web is pressed without drying. The solvent is then evaporated at 100°C and the release paper removed. The textile material now has an approximately 60 μ thick coating with a very pleasant soft feel coupled with high mechanical strength.

EXAMPLE 2

A number of tests carried out as in Example 1 are summarized in this Example (Table 1). In all Examples, the viscosities of the solutions were measured at 25°C with the Viscotester VT 02 manufactured by Messrs. Gebruder Haake of Berlin.

EXAMPLE 3

A. To one mol of an anhydrous macrodiol polycarbonate of triethylene glycol and tetraethylene glycol in a molar ratio of 1:1 with a hydroxyl number of 92 and an average molecular weight of approximately 1,220 are added 1 mol of hexamethylene diisocyanate and 1 mol of 1-isocyanato-3-isocyanato-methyl-3,5,5-trimethyl cyclohexane and the resulting mixture is stirred in the absence of a solvent for 3 hours at about 100°C. The NCO content is determined to be 5.1 percent NCO. The prepolymer is a highly viscous liquid at room temperature.

B. 2,000 parts of the prepolymer obtained in (A) are dissolved in 1,250 parts of ethylacetate and a solution of 107 parts of 4,4'-diamino dicyclohexyl methane and 26 parts of hydrazine hydrate in a mixture of 1,250 parts of water and 2,500 parts of ethanol are added to the resulting solution with stirring at 10°C. A clear solution of an elastomer with a viscosity of 20,000 cP is formed in an exothermic reaction during which the temperature rises to 25°C. The solution is coated onto glass plates and dried for 5 minutes at 120°C. A colorless, glossy lacquer is obtained which is completely unchanged after 600 hours exposure to the light of a UV-lamp.

EXAMPLE 4

The preparation of further polyurethane urea elastomers is summarized in Table 2. In each case, the procedure is as in Example 3.

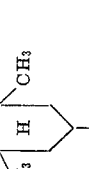

TABLE 1

TABLE 1—Continued

| Type of macrodiol polycarbonate used | Diisocyanate(s) NCO:OH ratio | Diamine(s) NCO:NH-ratio | Solvent | Properties of the elastomer solution | Preferred application of the polyurethane urea elastomers |
|---|---|---|---|---|---|
| IV ... As I | OCN-(CH$_2$)$_6$-NCO  NCO:OH=2:1. | ![structure: cyclohexane with CH$_3$, CH$_3$, H, CH$_3$, CH$_2$—NH$_2$, NH$_2$]  NCO:NH$_2$=1:0.90. | Ethanol: water 1.5:1. | Solids content 25% viscosity 25,000 cp. colorless, clear. | Elastic light stable and weather-resistant films. |
| V ... As I | ![structure: cyclohexane with CH$_3$, CH$_3$, H, CH$_3$, CH$_2$—NCO, NCO]  NCO:OH=2.3:1. | ![structure: cyclohexane with CH$_3$, CH$_3$, H, CH$_3$, CH$_2$—NH$_2$, NH$_2$]  NCO:NH$_2$=1:0.88. | Ethanol: water 1:1. | Solids content 20%, viscosity 100,000 cp.; colorless, clear. | Paper-coating agent. |
| VI ... As I | As V | ![structure: cyclohexane with CH$_3$, CH$_3$, H, CH$_3$, CH$_2$—NH$_2$, NH$_2$]  NCO:NH$_2$=1:0.80. | Ethanol: water 1.4:1. | Solids content 32%, viscosity 30,000 cp.; colorless, clear. | Paper-coating agent. |
| VII ... As I | As V | H$_2$N-CH$_2$-CH$_2$-NH$_2$. NCO:NH$_2$=1:0.99. | Ethanol: water 1:2. | Solids content 30%; viscosity 10,000 cp.; colorless, clear. | For very soft coatings and for priming leather. |
| VIII ... As I | As V | H$_2$N-NH$_2$:H$_2$O NCO:NH$_2$=1:0.88. | Ethanol: water 1:1. | Solids content 51%, viscosity 60,000 cp.; colorless, clear. | For stoving lacquers in combination with formaldehyde resins. |
| IX ... As I | As V | ![structure: H$_2$N—benzene ring—CH$_2$—benzene ring—NH$_2$] H$_2$N-NH$_2$:H$_2$O in a molar ratio of 1:1 NCO:NH$_2$=1:0.90. | Ethanol: water 1:1. | Solids content 30%, viscosity 250000 cp.; colorless, slightly hazy. | As VIII. |
| X ... As I | ![structure: cyclohexane with CH$_3$, CH$_3$, H, CH$_3$, CH$_2$—NCO, NCO] and OCN—(CH$_2$)$_6$—NCO in a molar ratio of 1:1 NCO:OH=2:1. | H$_2$N-NH$_2$:H$_2$O NCO:NH$_2$=1:0.90. | Ethanol: water 1:1. | Solids content, viscosity 9,000 c.p.; colorless, clear. | For coating polyamid fabrics. |

TABLE 1—Continued

| Type of macrodiol polycarbonate used | Diisocyanate(s) NCO:OH ratio | Diamine(s) NCO:NH₂-ratio | Solvent | Properties of the elastomer solution | Preferred application of the polyurethane urea elastomers |
|---|---|---|---|---|---|
| XI ... As I | ![structure: trimethylcyclohexane with CH₂—NCO and NCO groups] and OCN—(CH₂)₆—NCO in a molar ratio of 3:1 NCO:OH=2:1. | H₂N—NH₂·H₂O NCO:NH₂=1:0.90. | Ethanol: water 1:1. | Solids content 30%, viscosity 15,000 c.p.; colorless, clear. | For soft textile coatings. |
| XII ... As I | ![structure: trimethylcyclohexane with OCN and CH₂—NCO] and ![structure with NCO—(CH₂)₆—NCO] in a molar ratio of 1:3 NCO:OH=2:1. | H₂N—NH₂·H₂O NCO:NH₂=1:0.90. | Ethanol: water 1:1. | Solids content 20%, viscosity 20,000 c.p.; colorless, clear. | For extremely soft textile coatings (light stable). |
| XIII ... As I | As XII | ![structure: trimethylcyclohexylamine with CH₂—NH₂ and NH₂] NCO:NH₂=1:0.9. | Isopropanol: water 1:1. | Solids content 15%, viscosity 1,000 cp.; colorless, slightly hazy. | For very soft textile coatings. |
| XIV ... As I | ![structure: trimethylcyclohexane with CH₂—NCO] and ![structure: OCN—C₆H₄—CH₂—C₆H₄—NCO] in molar ratio of 1:2 NCO:OH=3:2. | H₂N—NH₂·H₂ONCO:NH₂=1:0.9. | Isopropanol: water 1:1. | Solids content 30%, viscosity 5,000 cp.; colorless, clear. | For coating leather. |
| XV ... As I | As XIV | ![structure: trimethylcyclohexylamine with CH₂—NH₂ and NH₂] NCO:NH₂=1:0.9. | Isopropanol: water 1:1. | Solids content 30%, viscosity 15,000 cp.; colorless clear. | For coating leather. |

TABLE 1—Continued

| | Type of macrodiol polycarbonate used | Diisocyanate(s) NCO:OH ratio | Diamine(s) NCO:NH₂-ratio | Solvent | Properties of the elastomer solution | Preferred application of the polyurethane urea elastomers |
|---|---|---|---|---|---|---|
| XVI | Tetraethylene glycol polycarbonate with a hydroxyl number of 121. | CH₃—(cyclohexane with CH₃, CH₃, H)—CH₂—NCO, NCO; NCO:OH=2:1. | CH₃—(cyclohexane with CH₃, CH₃, H)—CH₂—NH₂, NH₂; and H₂N—NH₂·H₂O molar ratio 1:1 NCO:NH₂=1:0.9. | methanol: water 1:1. | Solids content 33%, viscosity 5,000 cp.; colorless, clear. | For lacquering plastics. |
| XVII | As XVI | CH₃—(cyclohexane with CH₃, CH₃, H)—CH₂—NCO, NCO; and OCN—(CH₂)₆—NCO molar ratio 5:1 NCO:OH=4.8:1. | NH₂—NH₂·H₂O NCO:NH₂=1:0.88. | Ethanol: water 1:1. | Solids content 20%, initially clear solution which turns into a paste on standing. | Application as a spreadable paste for coating textiles. |
| XVIII | As XVI | CH₃—(cyclohexane with CH₃, CH₃, H)—CH₂—NCO, NCO; and OCN—(CH₂)₆—NCO and O=C—(C₆H₄)—CO—OCH₂CH₂—NCO molar ratio 2:1:1 NCO:OH=2:1. | NH₂—NH₂·H₂O NCO:NH₂=1:0.5. | Ethanol: water 1:1. | Solids content 25%, clear solution which turns into a paste on standing. | Application as a spreadable paste for textile coatings. |
| XIX | As XVI | CH₃—(cyclohexane with CH₃, CH₃, H)—CH₂—NCO, NCO; and OCN—(CH₂)₆—NCO molar ratio 1:1 NCO:OH=2:1. | NH₂—NH₂·H₂O and HN(CH₂—CH₂—OH)₂ molar ratio 10:1 NCO:NH₂=1:1. | Ethanol: water 1:1. | Solids content 30%, viscosity 5,000 cp.; clear, colorless. | Application for cross-linked lacquers and coatings with 5% by weight of O—CO—NH—CH₂—OCH₃ (CH₂)₄ O—CO—NH—CH₂OCH₃ |

TABLE 2

| | Macrodiol polycarbonate | Diisocyanate(s) NCO:OH ratio | Diamine(s) NCO:NH₂ ratio | Solvent | Properties of the elastomer solution | Preferred application |
|---|---|---|---|---|---|---|
| I | Polycarbonate of octaethylene glycol and 1,6-hexane diol in a molar ratio of 1:3.4 with an OH-number of 76.4. | CH₃—[cyclohexane with H, CH₃, CH₃]—CH₂—NCO, NCO; NCO:OH=2:1. | H₂N—[benzene]—CH₂—[benzene]—NH₂; NCO:NH₂=1:0.90. | Water: ethyl acetate:ethanol 1:2:3. | Solids content 30%, viscosity 70,000 cp. | Textile coating agent; particularly suitable as a finish. |
| II | Polycarbonate of tetraethylene glycol and 1,6-hexane diol in a molar ratio of 5:2 with a hydroxyl number of 90.4. | CH₃—[cyclohexane with H, CH₃, CH₃]—CH₂—NCO, NCO; NCO:OH=2:1. and (NCO)₆—CH₂—(NCO) (1:1) | H₂N—[benzene]—NH₂ and H₂N—NH₂·H₂O in a molar ratio of 1:1; NCO:NH₂=2:1. | Water:ethanol:ethyl acetate 1:2:1. | Solids content 20%, viscosity 50,000 cp. | Textile coating agent. |
| III | Tetraethylene glycol polycarbonate with a hydroxyl number of 63. | CH₃—[cyclohexane with H, CH₃, CH₃]—CH₂—NCO, NCO; NCO:OH=2:1. | [cyclohexane with CH₃, CH₃, H, CH₃] with CH₂—NH—CO—NH—NH₂ and CH₃, NH—CO—NH—NH₂; NCO:NH₂=1:0.90. | Water:isopropanol:ethyl acetate 2:1:1. | Solids content 25%, viscosity 30,000 cp. | Stoving lacquer and textile coating agent of high light stability. |
| IV | As III | OCN—[benzene]—CH₂—[benzene]—NCO; NCO:OH=2:1. | [cyclohexane with CH₃, CH₃, H, CH₃] with CH₂—NH₂ and CH₃, H₂N; NCO:NH₂=1:0.85. | Water:ethanol:methyl ethyl ketone 1:2:2. | Solids content 25%, viscosity 30,000 cp. | Coating of high elasticity |

EXAMPLE 5

A. A prepolymer containing NCO groups (NCO content 1.86 percent) is prepared from 1 mol of a tetraethylene glycol polycarbonate with a hydroxyl number of 28 and an average molecular weight of 4,000 with 2 mols of diphenyl methane-4,4'-diisocyanate by heating the components for 2 hours to 70°C. and is dissolved on heating to form a 50 percent solution in methyl ethyl ketone.

B. 900 parts of the solution of the prepolymer obtained in (A) are cooled to 0° to 10°C and then poured slowly onto a solution, cooled to the same temperature, of 15 parts of 1-amino-3-aminomethyl-3,5,5-trimethyl cyclohexane and 0.4 parts of dimethyl amine in a mixture of 450 parts of water and 180 parts of isopropanol. A clear viscous solution (viscosity 28,000 cP) is formed. A textile coating prepared with this solution is totally resistant to perchlorethylene.

EXAMPLE 6

496 parts of a polycarbonate from triethylene glycol with an OH number of 226 were dehydrated in vacuo (12 mm Hg) at 80° to 100°C, followed by the addition of 444 parts of 1-isocyanato-3-isocyanato methyl-3,5,5-trimethyl cyclohexane. The reaction was terminated after the NCO content had fallen to slightly below the value of 8.95 percent.

After cooling to room temperature, the prepolymer was a viscous, but still stirrable mass. 800 parts of water were introduced with vigorous stirring into this mass, resulting in the formation of a hazy, low-viscosity mixture. A prepared solution of 1-amino-3-amino-methyl, 3,5,5-trimethyl cyclohexane in 945 parts of ethanol and 200 parts of i-butanol were added to this mixture quickly, but not too quickly, with vigorous stirring. Towards the end of the addition there was a marked increase in the viscosity and the further introduction of amine solution was stopped when a viscosity of approximately 25,000 cP had been reached.

The completed solution was applied to a release paper (approximately 0.3 mm thick) and, after the solvent had been evaporated off, gave a clear, hard colorless film.

If the i-butanol is replaced by ethanol, the film clouds until it is milky white in appearance following the evarporation of the alcoholic fraction of the solvent. After the water has been evaporated, the cloudiness disappears and the film becomes clear.

EXAMPLE 7

A. 1,400 parts of a polycarbonate from triethylene glycol with an OH-number of 80 were dehydrated in vacuo (12 mm Hg) at 80° to 100°C, followed by the addition of 252 parts of 1,6-diisocyanato hexane. Formation of the prepolymer was regarded as complete after the NCO-content had fallen to slightly below the value of 2.54 percent. The viscous reaction mass was diluted with 420 parts of ethylacetate. 111 parts of 1-isocyanato-3-isocyanato methyl-3,5,5-trimethyl cyclohexane were slowly added to 50 parts of hydrazine hydrate in 1,680 parts of isopropanol. The finished solution was diluted with 1,680 parts of water and the solution of the prepolymer added gradually with vigorous stirring. Towards the end of the addition, there was a marked increase in the viscosity and the introduction of amine solution was stopped after a viscosity of approximately 30,000 cP had been reached. The finished solution was applied to a release paper (approximately 0.3 mm thick) and, after evaporation of the solvent, gave a soft, clear colorless film. B. 100 parts of the solution prepared as described above were stirred with 1.5 parts of a reaction product of 1,3-butane diol, methoxy methyl isocyanate and 0.3 parts of maleic acid, the resulting mixture was processed in the same way to form a film. If the dry film is heated for 40 – 60 seconds to 130° – 150°C, it is completely resistant after this treatment both to aqueous alcohol and also to water or alcohol.

C. A textile material was coated as follows with the solution prepared in accordance with B:

100 parts of the solution were mixed with 1.5 to 3 parts of a 50 percent paste obtained by grinding a conventional cellulose-acetobutyrate-modified pigment in methyl ethyl ketone, and the resulting mixture was applied to a release paper in a wet layer thickness of 100 $\mu$. Following the evaporation of the solvent, a second coat was applied, again in a wet layer thickness of 100 $\mu$, and the textile fabric, which was mechanically napped on one side, was placed with its napped side on the still wet coating, followed by uniform pressing by passage through a 0.5 to 1 mm wide roller gap. Following the evaporation of the solvent, the entire assemblage was exposed to a temperature of 130° to 150°C for from 40 to 60 seconds and the coated fabric subsequently separated from the release paper which was reusable.

The following modified procedures are also possible:

1. Following its application, the first coat is subjected to a heat shock (40 to 60 seconds at 130° – 150°C).
2. An unpigmented solution according to (B) is used as the second coat.
3. The only heat shock or, in the case of modification 1, the second heat shock (40 to 60 seconds at 130° – 150°C.) can also be applied after separation of the coated textile material from the release paper.

EXAMPLE 8

1,680 parts of a polycarbonate from triethylene glycol with an OH-number of 66.6 were dehydrated in vacuo at 80° – 100°C. followed by the addition of 444 parts of 1-isocyanato-3-isocyanato methyl-3,5,5-trimethyl cyclohexane. Formation of the prepolymer was regarded as complete after the NCO content had fallen to slightly below the value of 3.92 percent. The viscous reaction mass was diluted with 930 parts of acetone. 210 parts of 4,4'-diamino dicyclohexyl methane were dissolved in 1,400 parts of water and 2,300 parts of acetone and added quickly, but not too quickly, to the acetone prepolymer solution. Towards the end of the addition, there was a marked increase in the viscosity and the introduction of amine solution was stopped after a viscosity of 45,000 cP had been reached.

The completed solution was applied to a release paper (approximately 0.3 mm thick) and, after evaporation of the solvent, gave a soft, clear colorless film which showed outstanding resistance to the effect of light and hydrolysis.

EXAMPLE 9

1,940 parts of a polycarbonate from triethylene glycol with an OH-number of 56.8 were dehydrated in vacuo (12 mm Hg) at 80° – 100°C, followed by the addition of 444 parts of 1-isocyanato-3-isocyanato methyl-3,5,5-trimethyl cyclohexane. Formation of the prepolymer was regarded as complete after the NCO-content had fallen to slightly below the value of 3.53 percent. A solution of 210 parts of 4,4'-diamino-3,3'-dimethyl dicyclohexyl methane in 1,410 parts of water and 3,240 parts of ethyl alcohol was added in one addition to the prepolymer mass which was viscous at room temperature. The prepolymer began to react with the diamine with increasing dissolution. After a homogeneous mixture had been obtained the viscosity of the solution was 850 cP.

EXAMPLE 10

2,685 parts of a polycarbonate from triethylene glycol with an OH-number of 41.8 were dehydrated in vacuo (12 mm Hg), followed by the addition of 444 parts of 1-isocyanato-3-isocyanato methyl-3,5,5-trimethyl cyclohexane. Formation of the prepolymer was regarded as complete after the NCO-content had fallen to slightly below the value of 2.69 percent. The viscous reaction mass was diluted with 1520 parts of ethylacetate, followed by stirring for 15 minutes with 3 parts of butyl amine. A solution of 152 parts of 1-amino-3-amino methyl-3,5,5-trimethyl cyclohexane in 3,040 parts of water and 3,040 parts of isopropanol was then added to this solution over a period of about 30 minutes. After stirring for another 30 minutes, the viscosity remained constant at approximately 10,000 cP.

The completed solution was applied to a release paper (approximately 0.3 mm thick) and, following evaporation of the solvent and removal of the release paper, gave a very soft, clear colorless film.

EXAMPLE 11

1,015 parts of a polycarbonate from triethylene glycol and with an OH-number of 110.4 were dehydrated in vacuo (12 mm Hg) at 80° – 100°C, followed by the addition of 666 parts of 1-isocyanato-3-isocyanato methyl-3,5,5-trimethyl cyclohexane. Formation of the prepolymer was regarded as complete after the NCO-content had fallen to slightly below the value of 10.0 percent. The viscous reaction mass was diluted with 920 parts of ethylacetate. 304 parts of 1-amino-3-amino methyl-3,5,5-trimethyl cyclohexane were dissolved in 1,860 parts of water and 3,360 parts of isopropanol and the resulting solution added over a period of 30 to 60 minutes to the thoroughly stirred and cooled prepolymer solution. Towards the end of the addition, there was a marked increase in the viscosity and the introduction of amine solution was stopped after a viscosity of about 30,000 cP had been reached.

The completed solution was applied to a release paper (approximately 0.3 mm thick) and, following evaporation of the solvent, gave an extremely hard, clear and high-gloss film with outstanding resistance to the effect of light and hydrolysis. Following dilution with an $H_2O$ : alcohol mixture (1 : 2) to a viscosity of around 1,000 cP, the solution is suitable for the application of a finish by conventional methods (spraying, knife-coating, roll-coating, pressing etc.) A coating of 5 μ of solid substance is sufficient to obtain a smooth, dry feel, even on an extremely soft substrate (coated leather, textile or web).

Further Examples are set out in Table 3. The procedure of Example 7 was adopted for numbers 2,3,5,8,9,10,11,12,14,15 and 17 and 18 and the procedure of Example 9 for numbers 1,4,6,7,13 and 16.

TABLE 3

| | Type of macrodiol polycarbonate used | Diisocyanate(s) (NCO:OH ratio) | Diamine(s) (NCO:NH₂ ratio) | Solvent (proportions in percent by weight) | Properties of the elastomer solution | Preferred application of the polyurethane poly urea elastomer |
|---|---|---|---|---|---|---|
| 1 | Basis: triethylene glycol, molecular weight 500. | 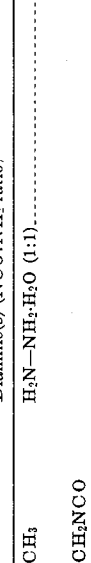 (2:1). | $H_2N-NH_2:H_2O$ (1:1) | $H_2O$, 50; ethanol, 40; t-butanol, 10. | Solids content 40%; colorless, slightly hazy. | Finish for textile coatings. |
| 2 | As 1 (MW 1,020) | As 1 (2:1) | As 1 (1:1) | | | Do. |
| 3 | As 1 (MW 1,180) | do | 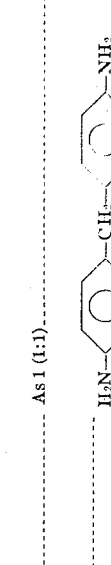 (1:1). | $H_2O$, 40; ethanol, 10; acetone, 50. | Solids content 35%; clear, low-viscosity solution. | Hard textile coating, plastics and rubber lacquer. |
| 4 | As 1 (MW 1,440) | do | 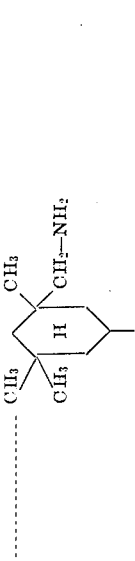 | $H_2O$, 40; isopropanol, 50; ethylacetate, 10. | Solids content 30%; slightly hazy solution; η:30,000 cP. | Surface layer for textile coating. |
| | | | | $H_2O$, 30; ethanol, 70 | Solids content 30%; clear solution | |

TABLE 3—Continued

| Type of macrodiol polycarbonate used | Diisocyanate(s) (NCO:OH ratio) | Diamine(s) (NCO:NH₂ ratio) | Solvent (proportions in percent by weight) | Properties of the elastomer solution | Preferred application of the polyurethane poly urea elastomer |
|---|---|---|---|---|---|
| 5 ....do.... | OCN—(CH₂)₆—NCO (1.5:1) | 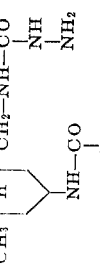 (1:0.9). | H₂O, 45; isopropanol, 45; ethylacetate, 10. | Solids content 30%; clear highly viscous solution. | Soft adhesive layer for textile coatings. |
| 6 ....do.... | As 1 (2:1) | H₂N—(CH₂)₆—NH₂(1:1) | H₂O 46 ethanol 41 i butanol 13 | Solids content 44%; η: 6,000 cp.; clear solution. | Elastic weather-resistant films. |
| 7 ....do.... | As 1 | H₂N—(CH₂)₂—NH₂(1:1) | H₂O 50 ethanol 40 i butanol 10 | Solids content 50%; clear solution; η: 6,000 cp. | Soft adhesive layer for textile coatings. |
| 8 ....do.... | OCN—(CH₂)₆—NCO (2:1). |  | H₂O, 45; isopropanol, 40; ethylacetate, 10. | Solids content 30%; clear highly viscous solution. | Textile coating; paper coating. |
| 9 ....do.... | As 8 (2:1) | As 8 plus H₂N—NH₂·H₂O, ratio 9:1 (1:1) | H₂O, 40; isopropanol, 40; ethylacetate, 20. | Solids content 30%; solution gels on standing. | Lacquering metals. |
| 10 ....do.... |  plus OCN—(CH₂)₆—NCO (2:1), ratio 1:1. | H₂N—NH₂·H₂O (1:1). | H₂O, 40; ethanol, 35; i-butanol, 15; ethylacetate, 10. | Solids content 50%; clear colorless solution. | Lacquer for plastics. |
| 11 ..... As 1 (MW 1,690) | As 1 (2:1) | 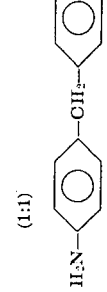 (1:1) | H₂O, 35; ethanol, 15; isopropanol, 35 methylethylketone, 15. | Solids contet 40%; slightly hazy solution; η:7,000 cp. | Soft textile coating. |
| 12 ....do.... | ....do.... | H₂N—⌬—CH₂—⌬—NH₂ Plus (CH₃—CH₂)₂—NH, ratio 99:1 (1:0.99). | H₂O, 42; isopropanol, 44; ethylacetate, 11. | Solids content 28.5%; slightly hazy solution; I: 13,000 cp. | Do. |

TABLE 3—Continued

| Type of macrodiol poly-carbonate used | Diisocyanate(s) (NCO:OH ratio) | Diamine(s) (NCO:NH₂ ratio) | Solvent (proportions in percent by weight) | Properties of the elastomer solution | Preferred application of the polyurethane poly urea elastomer |
|---|---|---|---|---|---|
| 13 ....do.... | ....do.... | H₂N—NH₂·H₂O (1:0.98) | H₂O, 40; ethanol, 35; i-butanol 15. | Solids content 43%; clear solution; η: 15,000 cp. | Adhesive layer for soft textile coatings. |
| 14 ....do.... | ....do.... | H₂N—(CH₂)₆—NH₂ (1:1) | H₂O, 40; ethanol, 35; i-butanol, 15; ethylacetate, 10. | Solids content 50%; η: 45,000 cp. | Elastic films of outstanding light stability |
| 15 ....do.... | ![structure with CH₃, CH₃, H, CH₂—NCO, NCO] Plus OCN—(CH₂)₅—NCO, ratio 1:1 (2:1). | ![structure with CH₃, CH₃, H, CH₂—NH₂, NH₂] Plus H₂N—NH₂·H₂O, ratio 1:1 (1:0.95). | H₂O, 35; isopropanol, 35; ethylacetate, 30. | Solids content 30%; clear colorless solution; η: 22,000 cp. | Textile coating of outstanding light stability. |
| 16 As 1 (MW 1,940) | As 1 (2.5:1) | ![structure with CH₃, CH₃, H, CH₂—NH₂, NH₂] (1:0.95). | H₂O, 30; ethanol, 70. | Solids content 50%; slightly hazy solution; η: 40,000 cp. | Textile coating with high resistance to hydrolysis. |
| 17 As 1 (MW 2,685) | As 1 (2:1) | As 16 plus CH₃—NH—(CH₂)₃—NH₂, ratio 99:1 (1:0.9) | H₂O, 40; isopropanol, 40; ethylacetate, 20. | Solids content 30%; clear solution; η: 10,000 cp. | Adhesive layer for very soft textile coatings. |
| 18 Same as above | Same as above | ![structure with CH₃, CH₃, H, CH₂—NH₂, NH₂] plus H₂N—NH₂·H₂O, ratio 9:1 (1:0.96). | H₂O, 40; isopropanol, 35; ethylacetate, 25. | Solids content 30%; η: 35,000 cp. | Very soft light-stable textile coating. |

What is claimed is:

1. Polyurethane urea elastomers corresponding to the formula:

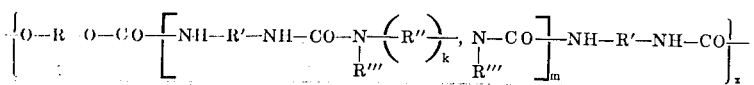

in which
R represents the group

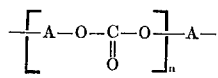

where 40 to 100 percent by weight of A represents $$-(CH_2-CH_2)-O-_p CH_2-CH_2-$$

and 0 to 60 percent by weight of A represents
$-(CH_2)-_q$
where
$p = 2-7$,
$q = 6$ or $7$,
$n = 2-40$,
R' represents a divalent $C_6-C_{14}$ aromatic, $C_4-C_{18}$ aliphatic or $C_5-C_{20}$ — cycloaliphatic radical,
R'' represents a divalent $C_6-C_{14}$ aromatic, $C_4-C_{18}$ aliphatic or $C_5-C_{20}$ — cycloaliphatic radical, which may contain nitrogen as heteroatom, or a $-NH-CO-(NH)-_rR^{IV}-(NH)-_sCO-NH-$group
where
$R^{IV}$ is a $C_1-C_{10}$ aliphatic or $C_5-C_{20}$ cycloaliphatic radical,
$r = 0$ or $1$;
$s = 0$ or $1$
R''' represents H or a $C_1-C_6$ aliphatic radical, and
$k = 0$ or $1$,
$m = 0-4$,
$x = 5-200$
at least 20 mol % of R' or R'' being cycloaliphatic radicals or at least 20 mol % of both R' and R'' being cycloaliphatic radicals.

2. The product of claim 1 wherein R represents the group

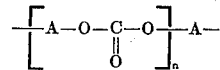

where 60 to 100 percent of A represents $-(CH_2-CH_2-O)-_pCH_2-CH_2-$ and 0 to 40 percent of A represents $(CH_2)_q$ and at least 40 mol percent of R' or R'' being cycloaliphatic radicals or at least 40 mol percent of R' and R'' being cycloaliphatic.

* * * * *